United States Patent [19]
Fujimoto

[11] Patent Number: 5,515,096
[45] Date of Patent: May 7, 1996

[54] COLOR IMAGE PROCESSING APPARATUS WITH PROCESSING MEANS FOR SELECTIVELY ADJUSTING COLOR IMAGE DATA TO INCREASE BLACK COLOR DENSITY AND REDUCE THE DENSITY OF OTHER COLORS

[75] Inventor: Masaya Fujimoto, Osaka, Japan

[73] Assignee: Mita Industrial Co., Ltd. (a corp. of Japan), Osaka, Japan

[21] Appl. No.: 89,350

[22] Filed: Jul. 12, 1993

[30] Foreign Application Priority Data

Jul. 13, 1992 [JP] Japan ................. 4-185240

[51] Int. Cl.$^6$ ...................................... H04N 1/21
[52] U.S. Cl. ................. 347/232; 347/251; 358/298
[58] Field of Search ........................ 347/115, 232, 347/240, 131, 251; 358/298, 530, 501, 458

[56] References Cited

U.S. PATENT DOCUMENTS

| | | |
|---|---|---|
| 5,134,667 | 7/1992 | Suzuki . |
| 5,357,353 | 10/1994 | Hirota ................. 358/530 |
| 5,387,983 | 2/1995 | Sugiura et al. ............ 358/458 |
| 5,398,124 | 3/1995 | Hirota ................. 358/530 |

FOREIGN PATENT DOCUMENTS

| | | |
|---|---|---|
| 248616 | 12/1987 | European Pat. Off. . |
| 348145 | 12/1989 | European Pat. Off. . |
| 241978 | 9/1989 | Japan . |
| 230678 | 10/1991 | Japan . |

OTHER PUBLICATIONS

Patent Abstracts of Japan, vol. 15, No. 240 (E–1079) 20 Jun. 1991 & JP–A–03 072 778 (Fuji Xerox Co., Ltd.) 27 Mar. 1991.
English Abstract corresponding to Japanese unexamined Patent Publication No. 230678/1991.

*Primary Examiner*—Mark J. Reinhart
*Attorney, Agent, or Firm*—Beveridge, DeGrandi, Weilacher & Young

[57] ABSTRACT

A color image processing apparatus where in the event of reproducing an image which has undergone an adaptive character-area processing with toner of four colors, the optimum filtering and halftone processing are performed depending upon the colors of the toner so that a high-grade color image which contains solid black characters having no blur can be obtained. For color image data of various colors including yellow, magenta, cyan and black for toner development, a coefficient of a filtering circuit (6) and a characteristic of a halftone processing circuit (8) are changed so as to practice a filtering and halftone processing for a character mode to the color image data of black, or practice the filtering and halftone processing for a photograph mode to the color image data other than black. In this way, even if a color photograph image contains images of black solid characters, the color photograph image can be reproduced into multi-leveled gradation, and moreover, the black solid character images contained therein can be reproduced having no blur with color with high resolution.

10 Claims, 13 Drawing Sheets

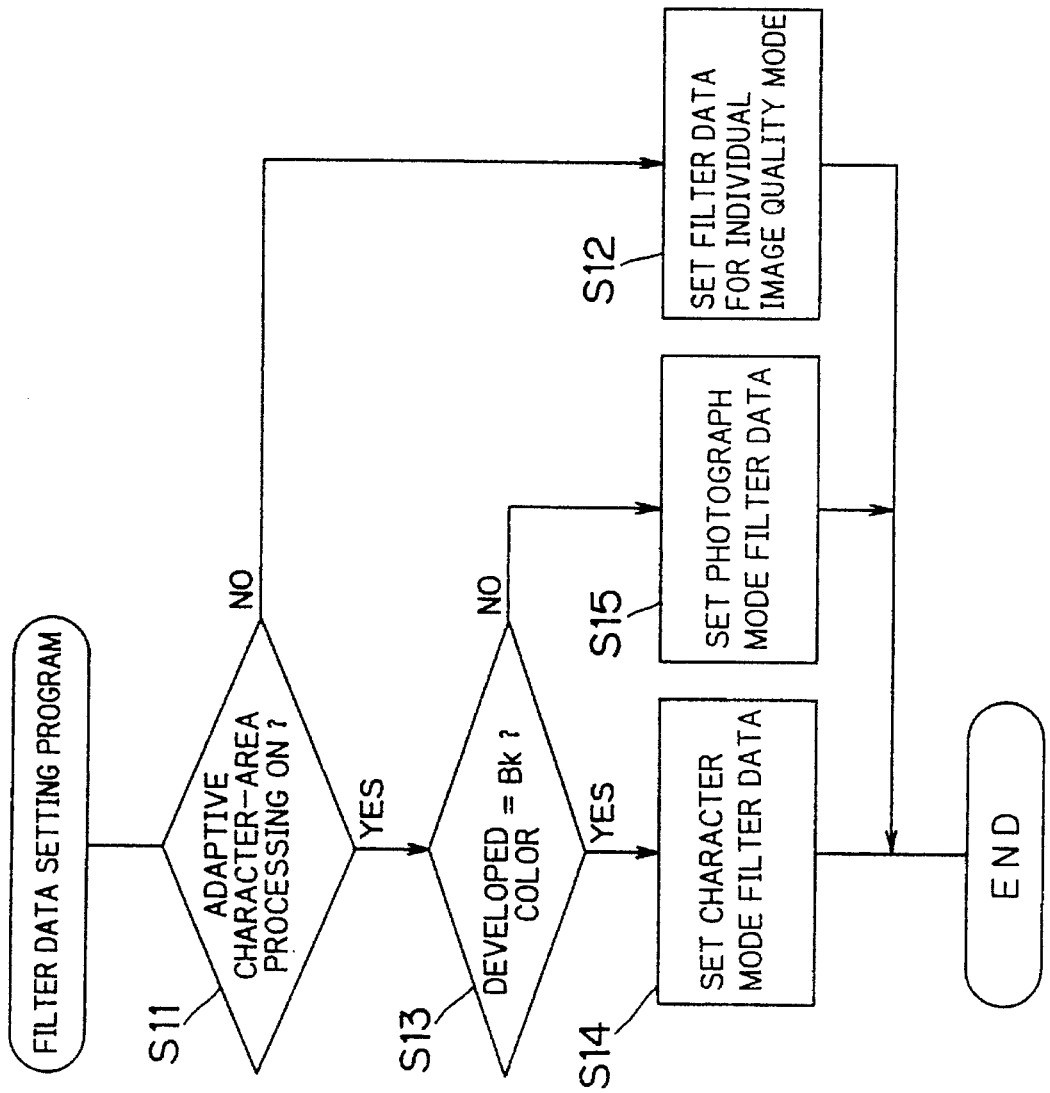

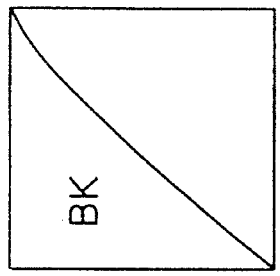
Fig. 10D BK
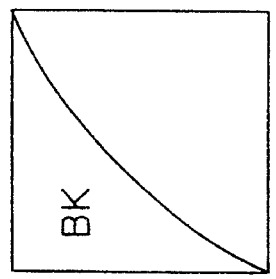
Fig. 11D BK
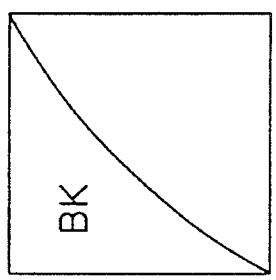
Fig. 12D BK
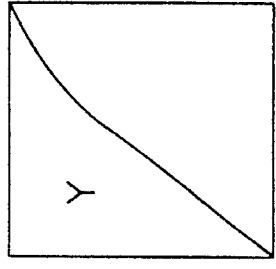
Fig. 10C Y
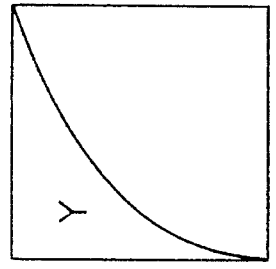
Fig. 11C Y
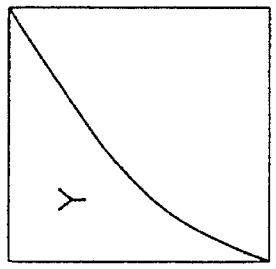
Fig. 12C Y
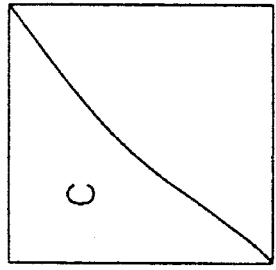
Fig. 10B C
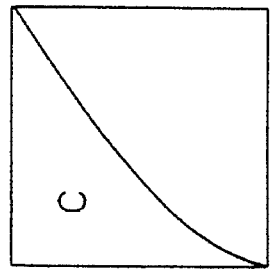
Fig. 11B C
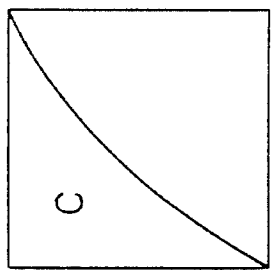
Fig. 12B C
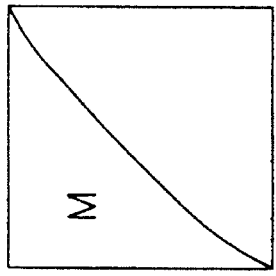
Fig. 10A M
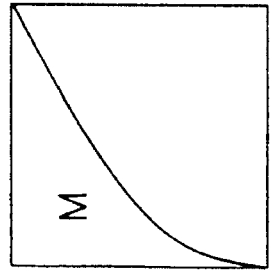
Fig. 11A M
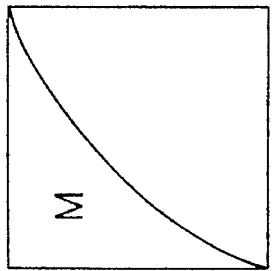
Fig. 12A M

COLOR IMAGE PROCESSING APPARATUS WITH PROCESSING MEANS FOR SELECTIVELY ADJUSTING COLOR IMAGE DATA TO INCREASE BLACK COLOR DENSITY AND REDUCE THE DENSITY OF OTHER COLORS

BACKGROUND OF THE INVENTION

1. Field of the Invention

The present invention relates to a color image processing apparatus built in a digital color copying machine or the like, and more particularly, it relates to a color image processing apparatus capable of reproducing both characters and photographs included in an original color image well into a color image.

2. Description of the Prior Art

Japanese Unexamined Patent Publication No. 241978/1989, for example, discloses a prior art embodiment of a color image processing apparatus capable of reproducing color graphics that are composed of characters and photographs well into color images.

The exemplary color image processing apparatus set forth in the official gazette processes an image to reproduce original solid black characters into images having no blur with color. For that purpose, the prior art apparatus performs a high resolution processing to reproduce characters with high resolution. In a high resolution process, an uncolored edge in a color image is detected. "Edge" herein is a part where a density is drastically changed. The detected uncolored edge is emphasized and the gradation of a colored portion contiguous to the noncolored edge is leveled down, and a color signal corresponding to the lowered gradation is further suppressed. As a result, a halftone area is processed into multi-leveled gradation, and the solid black characters and drawings are output at the gradation level closer to shadow with higher resolution.

Meanwhile, when image data already processed by the above-mentioned color image processing apparatus is used to practically reproduce a color image on a sheet, four-color toners including yellow, magenta, cyan and black, are usually used to form an image. A digital color copying machine, for example, has generally only one photoconductor drum for image formation, and therefore, image data is divided into four color image data of yellow, magenta, cyan and black, and the color image data are serially processed; that is, an image forming process which includes the steps of forming an electrostatic latent image on the photoconductor drum and the step of developing the latent image into a toner image is performed for one color after another.

In the prior art color image processing apparatus, a filter circuit and a halftone processing circuit are used commonly for processing the four color image data in forming a color image. Hence, even if a color image data read by a scanner or the like is processed so as to make a high resolution image as disclosed in the above-mentioned official gazette, image data of various colors are processed by the common filter circuit and halftone processing circuit in the practical image forming process, and thus, there arises the disadvantage that the high resolution processing performed in the preceding step does not reflect a sufficient effect upon the development of the toner.

More specifically, although the high resolution processing is performed to reproduce characters with high resolution, image data of various colors are processed according to a common filtering and a common halftone processing for toner development, and thus, there arises the disadvantage that a noncolored edge which is specially emphasized is blurred again.

SUMMARY OF THE INVENTION

It is a general object of the present invention to provide a color image processing apparatus which overcomes the above-mentioned disadvantage.

It is a specific object of the present invention to provide a color image processing apparatus where in the event of reproducing an image which has undergone an adaptive character-area processing in the precedent step with toners of four colors to obtain characters with high resolution, the optimum filtering and/or halftone processing are performed depending upon the colors of the toners so that a high-grade image which contains solid black characters or the like having no blur can be obtained on a sheet.

It is an another object of the present invention to provide a color image processing method which solves the above-mentioned disadvantage.

It is still another object of the present invention to provide a color image processing method where in the event of reproducing an image which has undergone an adaptive character-area processing in the precedent step with toners of four colors to obtain characters with high resolution, the optimum filtering and/or halftone processing are performed depending upon the colors of the toners so that a high-grade image which contains solid black characters or the like having no blur can be obtained on a sheet.

In accordance with the present invention, the image data which has undergone the adaptive character-area processing for reproducing noncolored character data with high resolution is divided into various color image data for development with toner of yellow, magenta, cyan and black, and a color image data processing such as a filtering, a halftone processing, etc. is performed for each color image data. In such a color image data processing, a processing for emphasizing black solid characters and drawings is performed for the color image data of black, and processing for well reproducing a halftone image is performed for the color image data other than black.

More specifically, in the event of performing a required filtering for the color image data, for example, a varied point of image data is emphasized for the color image data of black, and a varied point of the image data is smoothed for the color image data other than black.

Thus, the filtering for the color image data is performed so that the adaptive character-area processing performed in the preceding step can bring about the optimum effect, and therefore, in practice the color image can be reproduced with toner very well.

In the event of performing the halftone processing for the image data of the above-mentioned colors, for example, a halftone processing suitable for reproducing binary image is performed for the color image data of black, and a halftone processing for obtaining a density appropriate to the image data is performed for the color image data other than black. This allows the adaptive character-area processing in the precedent step to bring about the optimum effect after the halftone processing, and eventually, the color image can be reproduced well.

As described in the foregoing, in accordance with the present invention, an appropriate data processing is performed for each color image data, and the adaptive character-area processing can bring about the optimum effect in an image practically reproduced with toner. In this way, a color photograph image can be reproduced into a high-graded color image having no blur in black solid characters and the like.

These and other objects, features and effects of the present invention will become more fully apparent from the following detailed description of the preferred embodiments when taken in conjunction with the accompanying drawings.

The disclosure of Japanese Patent Application Serial No. 185240/1992 filed on 13th of Jul., 1992, is incorporated herein by reference.

BRIEF DESCRIPTION OF THE DRAWINGS

FIG. 1 is a block diagram showing an exemplary system architecture of a differentiating filter;

FIG. 9 is a flow chart illustrating an operation by a CPU in setting data in the differentiating filter and the integrating filter;

FIGS. 10A, 10B, 10C and 10D are diagrams showing characteristics of relations between input value and output density in a photograph mode in a halftone processing circuit;

FIGS. 11A, 11B, 11C and 11D are diagrams showing characteristics of relations between input value and output density in a character mode in a halftone processing circuit;

FIGS. 12A, 12B, 12C and 12D are diagrams showing characteristics of relations between input value and output density in a character-photograph mode in a halftone processing circuit;

DESCRIPTION OF THE PREFERRED EMBODIMENTS

A color image processing apparatus built in a digital color copying machine of an embodiment according to the present invention will be described below.

Figure 1:
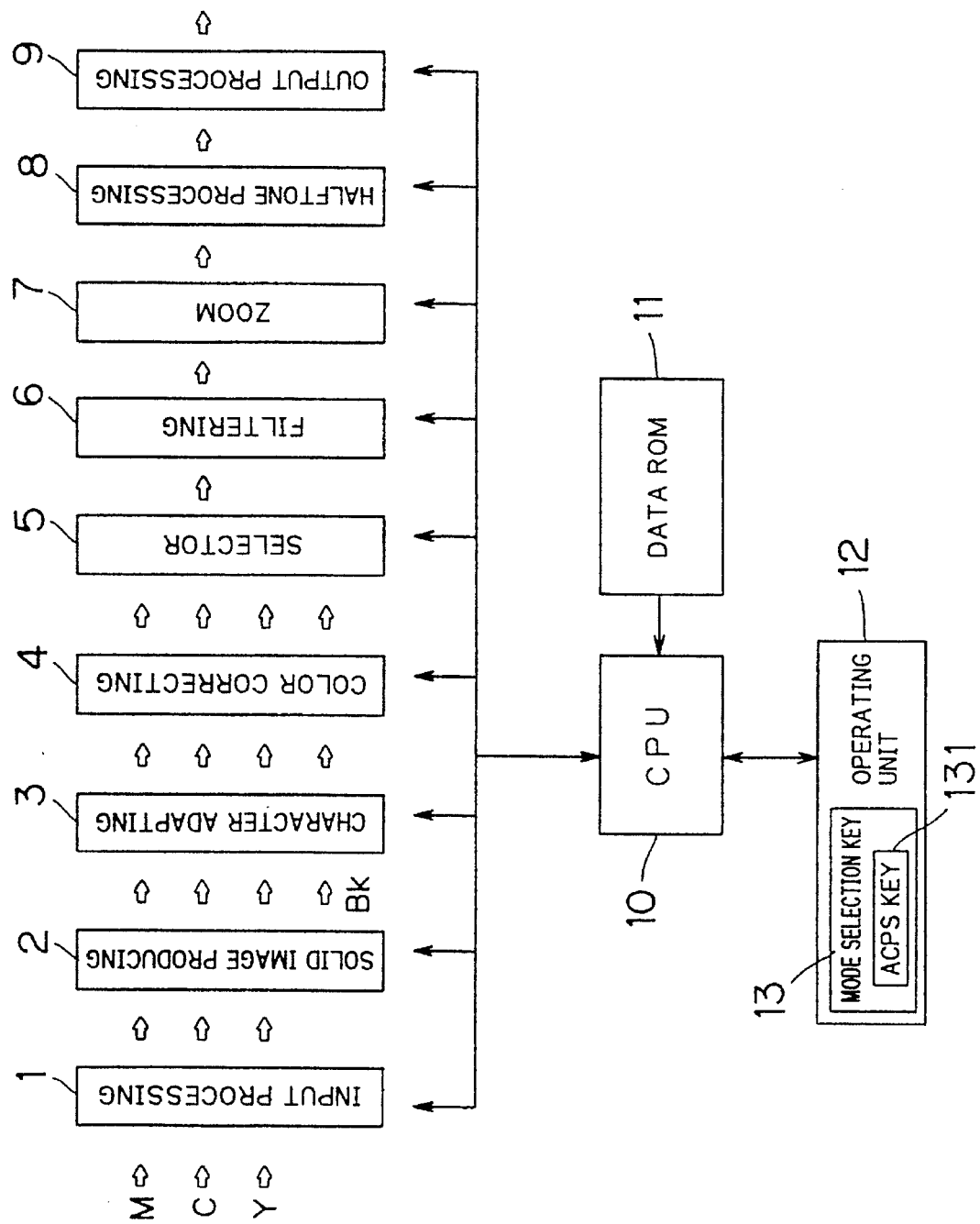
FIG. 1 is a block diagram showing a system architecture of a color image processing apparatus built in a digital color copying machine of an embodiment according to the present invention.

FIG. 1 is a block diagram showing an exemplary system architecture of such a color image processing apparatus built in the digital color copying machine of an embodiment according to the present invention.

Image data is identified by a scanner (not shown) or the like with three types of color image data of yellow (Y), magenta (M) and cyan (C), and then applied to an input processing circuit 1. The scanner for reading a color image, for example, electrically scans the image data in a specified direction (primary scanning) and mechanically scans it in the direction orthogonal to the specified direction (secondary scanning). The scanner outputs sequentially lines of data corresponding to the electrical primary scanning to the input processing circuit 1.

In the input processing circuit 1, applied image data is buffered in an internal memory (not shown) in order to convert frequencies for processing image data from operation frequencies of a scanning unit into frequencies adaptable in this circuit. The image data output from the input processing circuit 1 is applied to a solid image producing circuit 2.

The solid image producing circuit 2 detects a minimum value of three image data of Y, M and C. The minimum value is converted into UCR(Under Color Removing) data by applying a specified table. The UCR data undergoes Gamma correction to produce the solid black (referred to as "Bk" herein after) image data. The value obtained by multiplying the USR data by a specific correction coefficient is subtracted from three colors of image data Y, M and C, results of which are deemed as new Y, M and C data. Thus, the solid image producing circuit 2 outputs the solid black image data in addition to three colors of the image data Y, M and C and applies four colors of image data to a character adapting circuit 3.

The character adapting circuit 3 is operative only when an ACPS key 131 as mentioned below is selected to conduct an adaptive character-area processing through which a solid black character in a color image, for example, can be formed of black pixels with higher resolution.

Specifically, when a color original image is reproduced by superposing toners of Y, M, C and Bk upon one another, a pixel's color made by superposition of the toners somewhat deviate from the desired color. Hence, when the resultant color image contains a solid black character, an edge of the solid black character is blurred. Especially with a small black character of 8 points or under in a color image, the character may not sufficiently be conspicuous to identify it.

Thus, the character adapting circuit 3 is utilized to detect pixels constituting the edge of the solid black character from the color image data to reproduce the detected pixels at a density as close as possible to the density obtained by the Bk toner alone.

Pixels constituting the edge are identified, for example, by first setting a matrix of 3×3 pixels for magenta components of the image data and then identifying the edge pixels based upon a variation in a density level after a smoothing process where the variation in the density level is blurred; that is, pixels showing a relatively great change in density level even after smoothing are identified with the edge pixels.

Smoothing is a process in which, for example, the mean value of each of M components of the image data in the 3×3 pixel matrix around a target pixel is calculated. More specifically, the 3×3 pixel matrix shown by the following formula (1) is used. That is, the M data of each pixel within the 3×3 pixel matrix is multiplied by coefficient "1", and the results of the multiplication are added all together. The resulted value is divided by "9" which corresponds to the number of the pixels in the matrix.

$$\frac{1}{9} \times \begin{array}{|c|c|c|} \hline 1 & 1 & 1 \\ \hline 1 & 1 & 1 \\ \hline 1 & 1 & 1 \\ \hline \end{array} \qquad (1)$$

In some case, weighting on the target pixel is performed by applying the 3×3 matrix shown by the following formula (2).

$$\frac{1}{10} \times \begin{array}{|c|c|c|} \hline 1 & 1 & 1 \\ \hline 1 & 2 & 1 \\ \hline 1 & 1 & 1 \\ \hline \end{array} \qquad (2)$$

The solid pixel is detected based on the difference in density with respect to the same pixel among Y, M, C components. Specifically, when all of the following formulas (3) through (6) where Tc and Tb are threshold of judgment are held, the pixel is identified as the solid pixel. In a case where an image data is expressed with 8 bits (256 tones), Tc and Tb are set, for example, 40 and 140 respectively.

$$|Y-M| \leq Tc \qquad (3)$$

$$|M-C| \leq Tc \qquad (4)$$

$$|C-Y| \leq Tc \qquad (5)$$

$$Bk > Tb \qquad (6)$$

If the target pixel is the edge and solid pixel, it is judged as the pixel constituting a character, so that the density adjustment is performed so as to reduce the density of Y, M and C components and increase the density of Bk component. For example, Y, M and C components data is reduced to 50% of the original data while the Bk component is increased to 150 to 200% of the original data.

Such an adaptive character-area processing is exemplified in the color image processing apparatus disclosed in Japanese Unexamined Patent Publication No. 241978/1989.

The image data which has undergone the adaptive character-area processing in the character adapting circuit 3 (or the image data which has skipped the character adapting circuit 3 when the circuit is not operative) is applied to a color correcting circuit 4 so as to perform color matching for each of color data including yellow, magenta, cyan and black. The color matching herein is to correct a signal level or the like so as to be suitable to a characteristic of toner development. An output from the color correcting circuit 4 is applied to a color selector 5.

The color selector 5 selects specified one of the four image data of colors including yellow, magenta, cyan and black to output selected data. The color image data selected by the color selector 5 is transmitted to a filtering circuit 6 at the succeeding stage. The color selector 5 selects and outputs the color image data of Y, M, C and Bk one after another.

In this way, a series of elements from the input processing circuit 1 to the color selector 5 process the image data of the four colors including yellow, magenta, cyan and black all together, but elements succeeding to the color selector 5 conduct serial processing for the image data of those colors one after another due to a general system architecture of the digital color copying machine. Specifically, the digital color copying machine generally has a photoconductor drum and four toner developing devices for developing an electric latent image formed on the photoconductor drum corresponding to four colors Y, M, C and Bk, and the developing devices turn ON or OFF one by one at a time as required. Thus, for each of the four colors of Y, M, C and Bk, an electric latent image is first formed on the photoconductor drum and then developed into a toner image one color at a time. In other words, an image forming processing is serially performed related to color image data of the four colors.

The color image data selected and output by the color selector 5 is applied to the filtering circuit 6 and undergoes a filtering process.

The color image data which has already undergone the filtering process is transferred to a zoom circuit 7 for magnification and reduction in size, and the color image data which has been processed by the zoom circuit 7 is applied to a halftone processing circuit 8.

The halftone processing circuit 8 utilizes the well-known multi-value dither technique where a dither method and a method of representing one dot with 64 minute pixels by varying an output time of laser beam for exposing the photoconductor drum are combined to produce a color image signal representing a halftone. An output from the halftone processing circuit 8 is applied to an output processing circuit 9.

The output processing circuit 9 receives the image signal which has undergone a halftone processing, produces an output video signal from the received signal to drive a semiconductor laser (not shown) for exposing the photoconductor drum, and output the output video signal.

The above-mentioned circuits of the color image processing apparatus are all connected to a CPU 10 and controlled by it. The CPU 10 is connected to a data ROM 11 which stores a filter coefficient for the filtering circuit 6, dither matrix data for the halftone processing circuit 8, etc. They are read by the CPU 10 and transferred to the filtering circuit 6 and halftone processing circuit 8.

The CPU 10 is also connected to an operating unit 12 which has a plurality of mode selection keys 13 for setting an image reproducing mode. The mode selection keys 13 are manipulated in accordance with types of originals which are to be copied. The mode selection keys 13 includes a character mode key selected for a character original, a character-photograph mode key selected for a character-photograph combined original, and a photograph mode key selected for a photograph original, although not shown in the drawing. The mode selection key 13 further includes the ACPS (Adaptive Character-area Processing system) key 131 selected for a character-photograph combined original when the adaptive character-area processing is required, as shown in the drawing.

In this embodiment, when the ACPS key 131 of the mode selection keys 13 is manipulated, a signal setting an ACPS mode is applied by the operating unit 12 to the CPU 10. Accordingly, the CPU 10 reads data corresponding to the ACPS mode from the data ROM 11 and sets processing data for the ACPS mode to the filtering circuit 6 and the halftone processing circuit 8.

An operation of the color image processing apparatus of FIG. 1 in the ACPS mode will be described below.

The filtering circuit 6 shown in FIG. 1 includes a differentiating filter and an integrating filter; that is, the color image processing apparatus combines the differentiating filer and the integrating filter in accordance with the image reproducing mode to perform a filtering process. This is because, the differentiating filter functions to emphasize a varying point of image data and is used to emphasize an outline of character data, photograph data and the like. On the other hand, the integrating filter functions to smooth a conspicuously varied portion of data and is used to smooth multi-gradation data such as a photograph or to prevent moire of a halftone original.

In this embodiment, when the ACPS key 131 is selected to choose the adaptive character-area processing mode, the differentiating filter and/or the integrating filter is selected in accordance with the color of the processed image data, or the color of the developed toner, and the filter coefficient is varied, so as to conduct the optimum filtering.

A system architecture of the filtering circuit will be more specifically described below.

Figure 2:
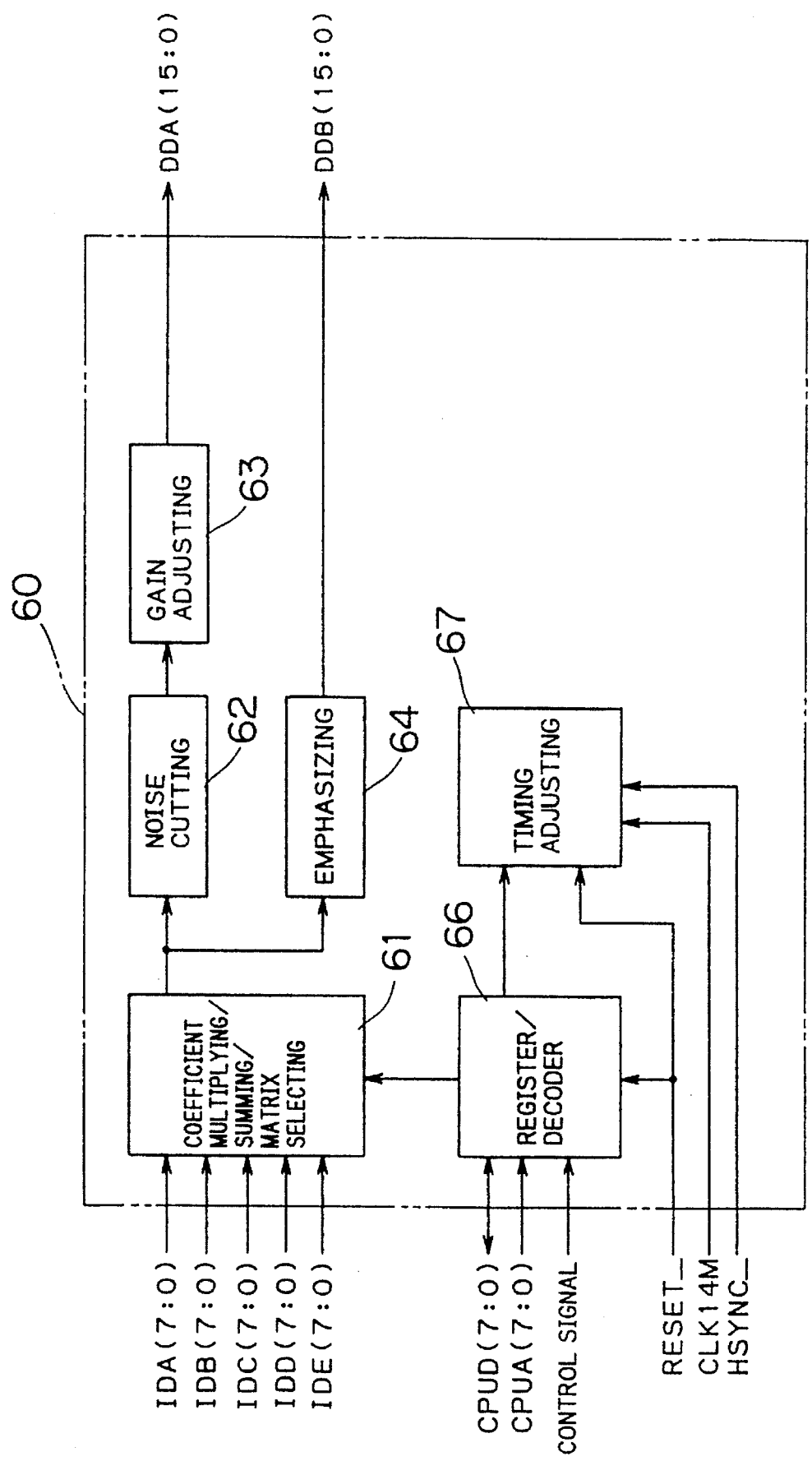

FIG. 2 is a block diagram showing an exemplary structure of the differentiating filter. Referring to FIG. 2, the differentiating filter 60 includes a coefficient multiplying/summing/matrix selecting circuit 61 to which five lines of image data IDA, IDB, IDC, IDD and IDE (each data is 8 bit) adjacent to one another in the secondary scanning direction are applied in parallel.

The image data processed by this circuit is output as an output data DDA (16 bit) via a noise cutting circuit 62 and a gain adjusting circuit 63. An output of a coefficient multiplying/summing/matrix selecting circuit 61 is output as an emphasized output data DDB (16 bit) via an emphasizing circuit 64.

The differentiating filter 60 further includes register/decoder 66 receiving data CPUD (8 bit) and address CPUA (8 bit) from the CPU 10 and a timing adjusting circuit 67. The data CPUD from the CPU 10 is held and decoded by the register/decoder 66, and it is transmitted to the coefficient multiplying/summing/matrix selecting circuit 61 after its timing is adjusted by the timing adjusting circuit 67. As a result, the data received from the CPU 10 allows a filter for second differentiation in the coefficient multiplying/summing/matrix selecting circuit 61 to be changed in accordance with the image data.

The register/decoder 66 receives a reset signal RESET to reset the data held therein. The reset signal RESET is also applied to the timing adjusting circuit 67 as a reference signal for timing adjustment. To the timing adjusting circuit 67, a clock signal CLK14M of 14 MHz and a horizontal synchronizing signal HSYNC as a reference signal in processing single lines of data are further input.

Figure 3:
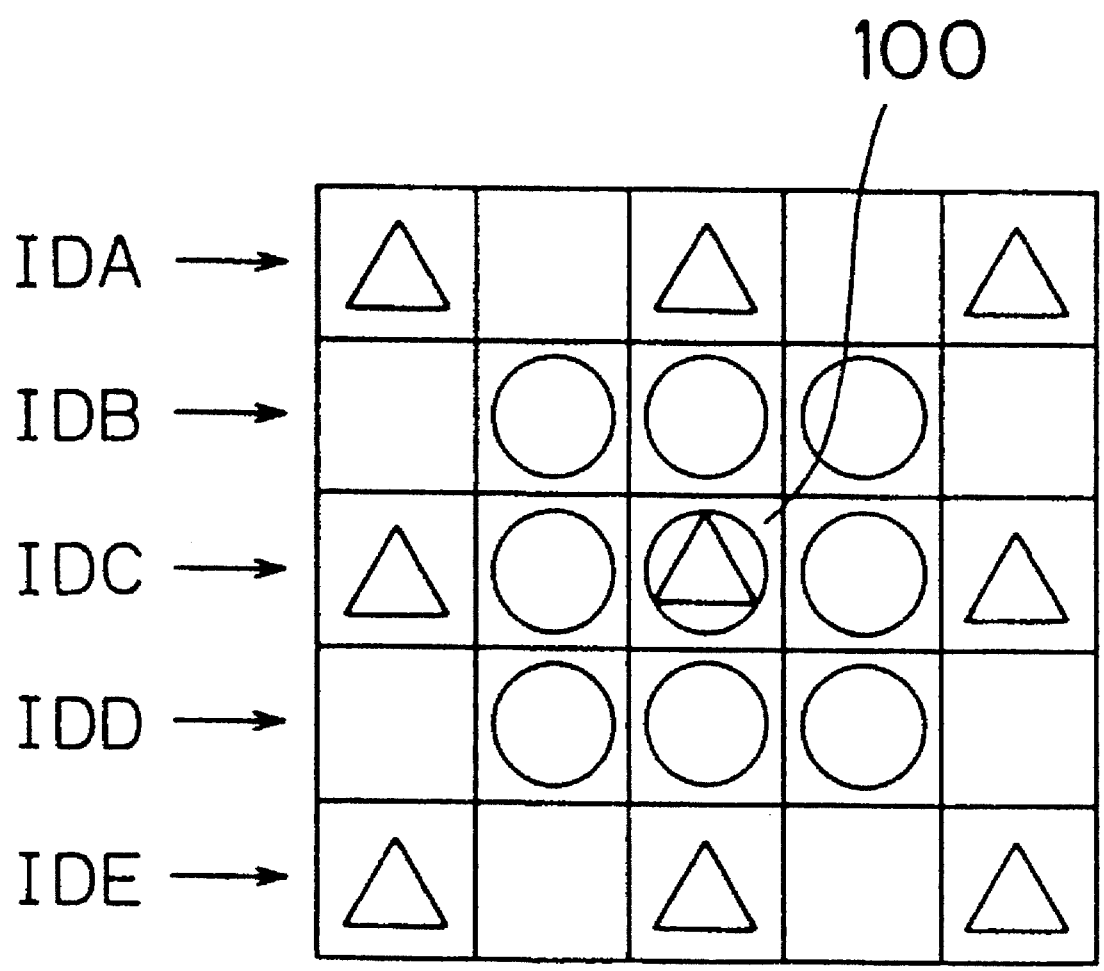
FIG. 3 is a diagram illustrating data processing in the differentiating filter.

FIG. 3 is a diagram showing a pixel matrix to be processed in the differentiating filter 60. The differentiating filter 60 performs the data processing in accordance with either a first mode or a second mode where in the first mode the data processing is performed based on the image data of nine pixels which are expressed with the symbol "◯" in FIG. 3 and in the second mode it is based on the image data of a pixel expressed with the symbol "△" in FIG. 3. That is, in the first mode data of a target pixel and data of eight pixels adjacent to the target pixel are used while in the second mode data of the target pixel 100 and data of eight pixels arranged at a distance of one pixel from the target pixel.

Then, each image data of nine pixels to be processed is multiplied by a predetermine coefficient, the results of which are summed up. The resulted value of the summing is multiplied by a specific gain coefficient so as to obtain the filter processed image data.

Figure 4:
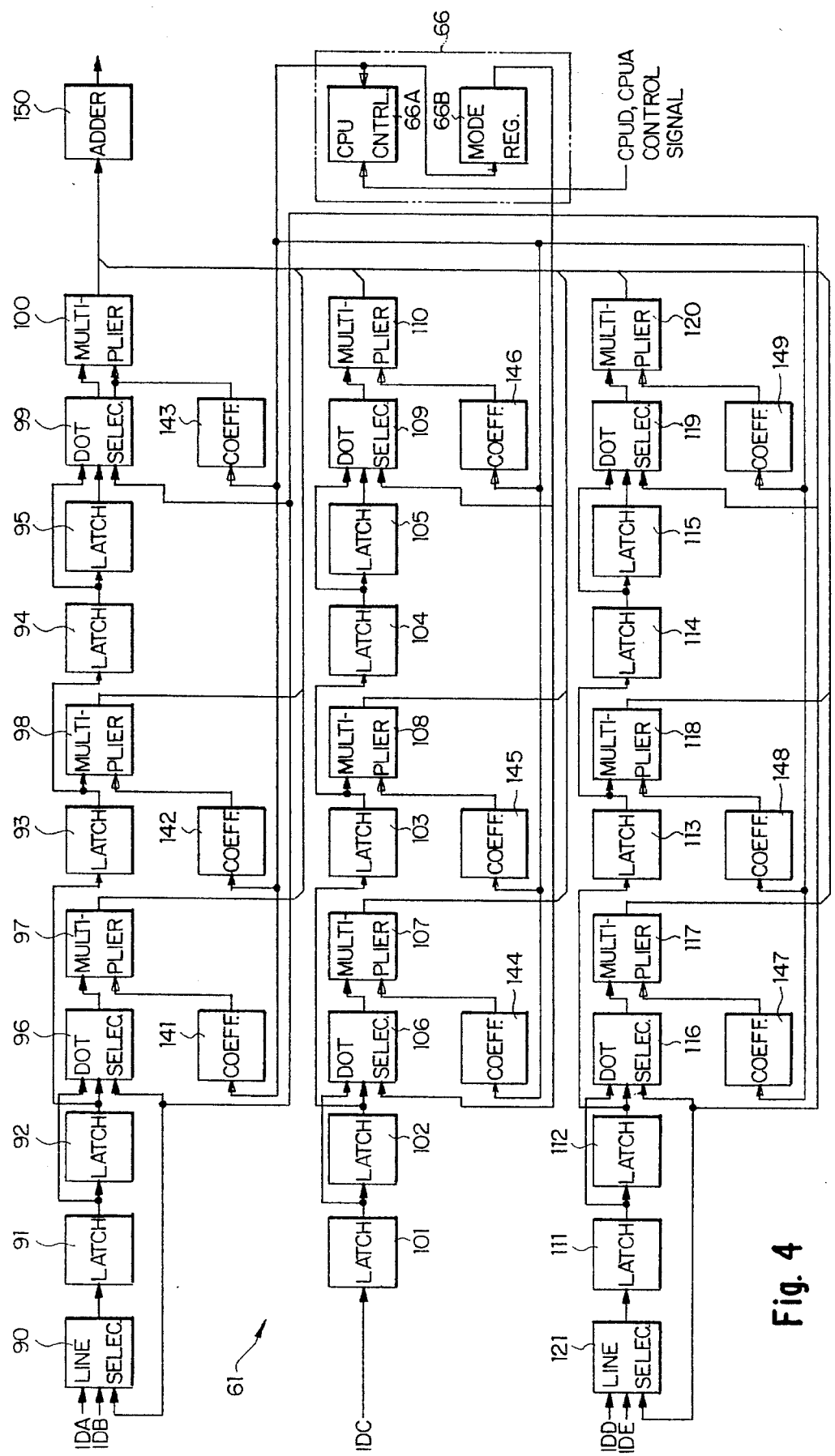
FIGS. 4 and 5 are block diagrams showing a detailed architecture of a circuit in the differentiating filter.

FIG. 4 is a block diagram showing a detailed structure of a coefficient multiplying/summing/matrix selecting circuit 61. Data IDA, IDB, IDC, IDD and IDE for five lines are input so as to obtain data of 5×5 pixel matrix. In the above mentioned first mode data IDB, IDC and IDD of the second, third and fourth lines respectively are used while in the second mode data IDA, IDC and IDE of the first, third and fifth lines are used. Data IDA and IDB of the first and second lines respectively are input to a line selector 90. The selecting signal is input to the line selector 90 from a mode register 66B retaining data to express the first or second mode. The line selector 90 selects data IDB of the second line in the first mode, and select data IDA of the first line in the second mode.

Output data from the line selector 90 is input in order to five latch circuits 91, 92, 93, 94 and 95 connected in series. Each of the latch circuits 91 to 95 is capable of storing data of one pixel. Thus, data of sequential five pixels in the above mentioned first or second line may be retained in the latch circuits 91 to 95. A dot selector 96 selects either one of the output data of the latch circuits 91 or 92 retaining data of the first and second pixels out of the five pixels. The selected data is input to a multiplier 97 so as to be multiplied by a value retained in a coefficient register 141. A multiplication result is input to an adder 150. A dot selector 96 receives from the mode selector 66B the selected signal, based on which the dot selector 96 selects the output data of the latch circuit 92 corresponding to the second pixel in the first mode, while it selects the output data of the latch circuit 91 corresponding to the first pixel in the second mode.

The dot selector 99 receives the output data of the latch circuits 94 and 95 corresponding to the fourth and fifth pixels. Based on the selected signal input from the mode register 66B, the dot selector 99 selects the output data of the latch circuit 94 in the first mode while it selects the output data of the latch circuit 95 in the second mode.

The similar construction is adopted for the data IDC of the third line with an exception that a line selector is not provided since the data IDC of the third line is used in both of the first and second modes.

More specifically, the data IDC of the third line is input in order to the latch circuits 101, 102, 103, 104 and 105 connected in series. The data of either the first or second pixels is selected by a dot selector 106 while data of either the fourth or fifth pixels is selected by a dot selector 109.

In multipliers 107, 108 and 110, the following multiplications are performed respectively; multiplying the output data of the data selector 106 by a coefficient retained in a coefficient register 144, multiplying the output of a latch circuit 103 corresponding to the third pixel by a coefficient retained in a coefficient register 145, and multiplying the output data of a dot selector 109 by a coefficient retained in a coefficient register 146. Each output data from the multiplier 107, 108 and 110 are input to the adder 150.

The construction for the data IDD and IDE of the forth and fifth lines are same as the one for the data IDA and IDB of the first and second lines. That is, the data IDD or IDE of the forth or fifth lines is selected in a line selector 121. The data of the selected line is input in order to five latch circuits 111, 112, 113, 114 and 115 connected in series. The output data of either one of the latch circuit 111 or 112 is selected in a dot selector 116 and inputs to an multiplier 117 to which a coefficient retained in a coefficient register 147 is applied. The output of the latch circuit 113 is multiplied by a coefficient retained in a coefficient register 148 in a multiplier 118. Either one of the output data of the latch circuit 114 or 115 is selected in a dot selector 119 and input to a multiplier 120 to which a coefficient retained in a coefficient register 149 is applied. The output of the multipliers 117, 118 and 120 are input to the adder 150.

In the adder 150, the values input from nine multipliers are summed up. The summed value is to be output data of a coefficient multiplying/summing/matrix selecting circuit 61.

The mode register 66B is a register provided in the register/decoder 66 (see FIG. 2). The mode register 66 connected to a CPU control unit 66A receiving data CPUD, address CPUA and the control signal from the CPU 10 (see FIG. 1). The CPU control unit 66A writes to the mode register 66B a mode information input from the CPU 10, and writes to the coefficient register 141 to 149 a coefficient input from the CPU 10.

Figure 5:
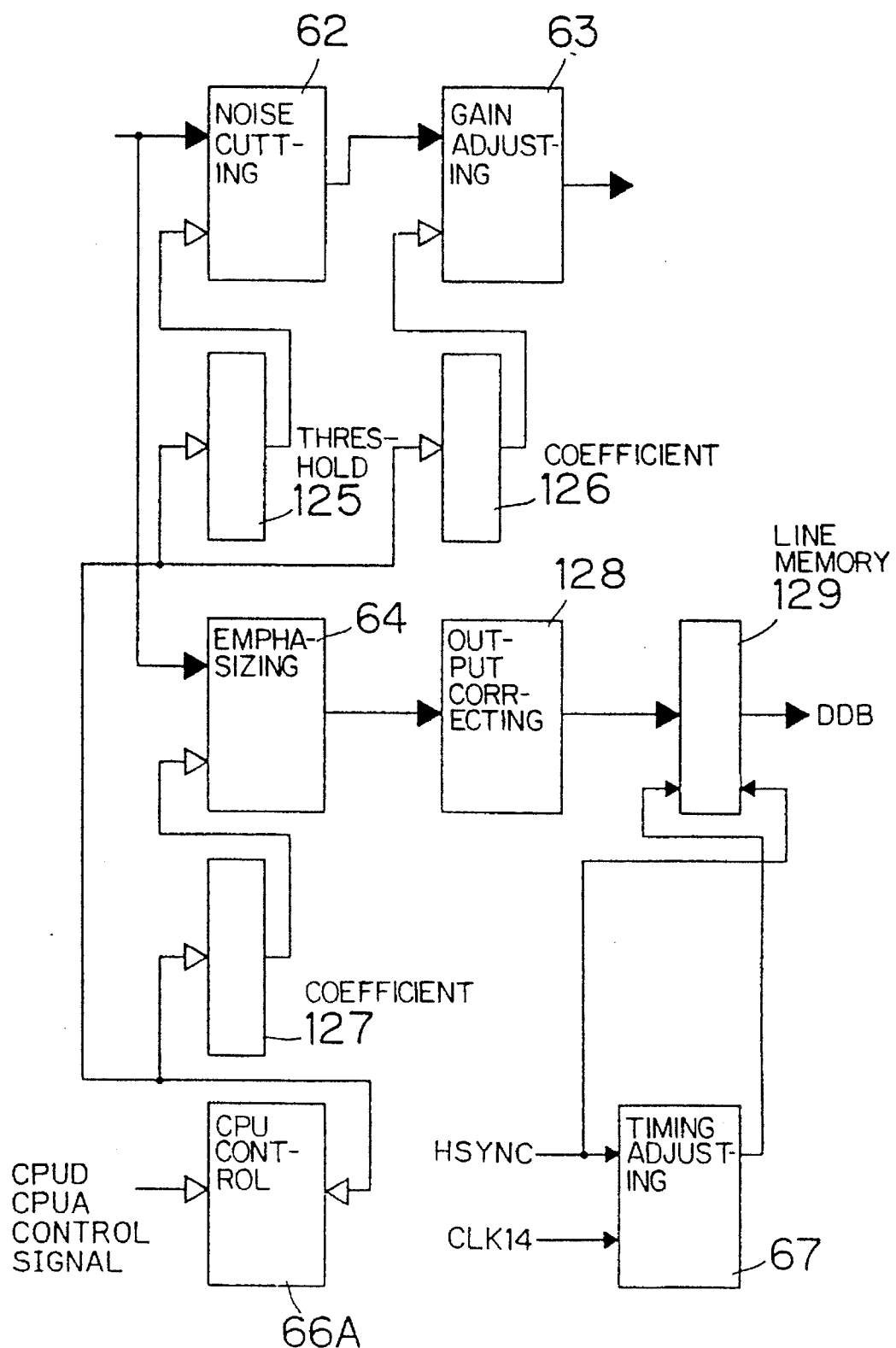

FIG. 5 is a block diagram showing a specific configuration related to the noise cutting circuit 62, the gain adjusting circuit 63 and the emphasizing processing circuit 64. The output of a coefficient multiplying/summing/matrix selecting circuit 61 is input to the noise cutting circuit 62. The noise cutting circuit 62 cuts noise in the image data by omitting data less than a threshold value in a threshold register 125. The noise cutting circuit 62 inputs data into the gain adjusting circuit 63. The gain adjusting circuit 63 adjusts a gain of the differentiating filter 60 by multiplying the input data by a coefficient set in a coefficient register 126. The output of the gain adjusting circuit 63 is to be second differentiating data DDA.

The output from a coefficient multiplying/summing/matrix selecting circuit 61 undergoes an emphasizing processing in the emphasizing processing circuit 64. The emphasizing processing is performed by dividing the output data from a coefficient multiplying/summing/matrix selecting circuit 61 by a coefficient set in a coefficient register 127. The output from 64 is input to a line memory 129 adjusting a data output timing after being received the processing relating to an overflow in an output correcting circuit 128. The output from the line memory 129 is to be the emphasized data DDB.

In the threshold register 125, the coefficient register 126 and the coefficient 127, data are set from the CPU 10 through CPU control unit 66A.

Figure 6:
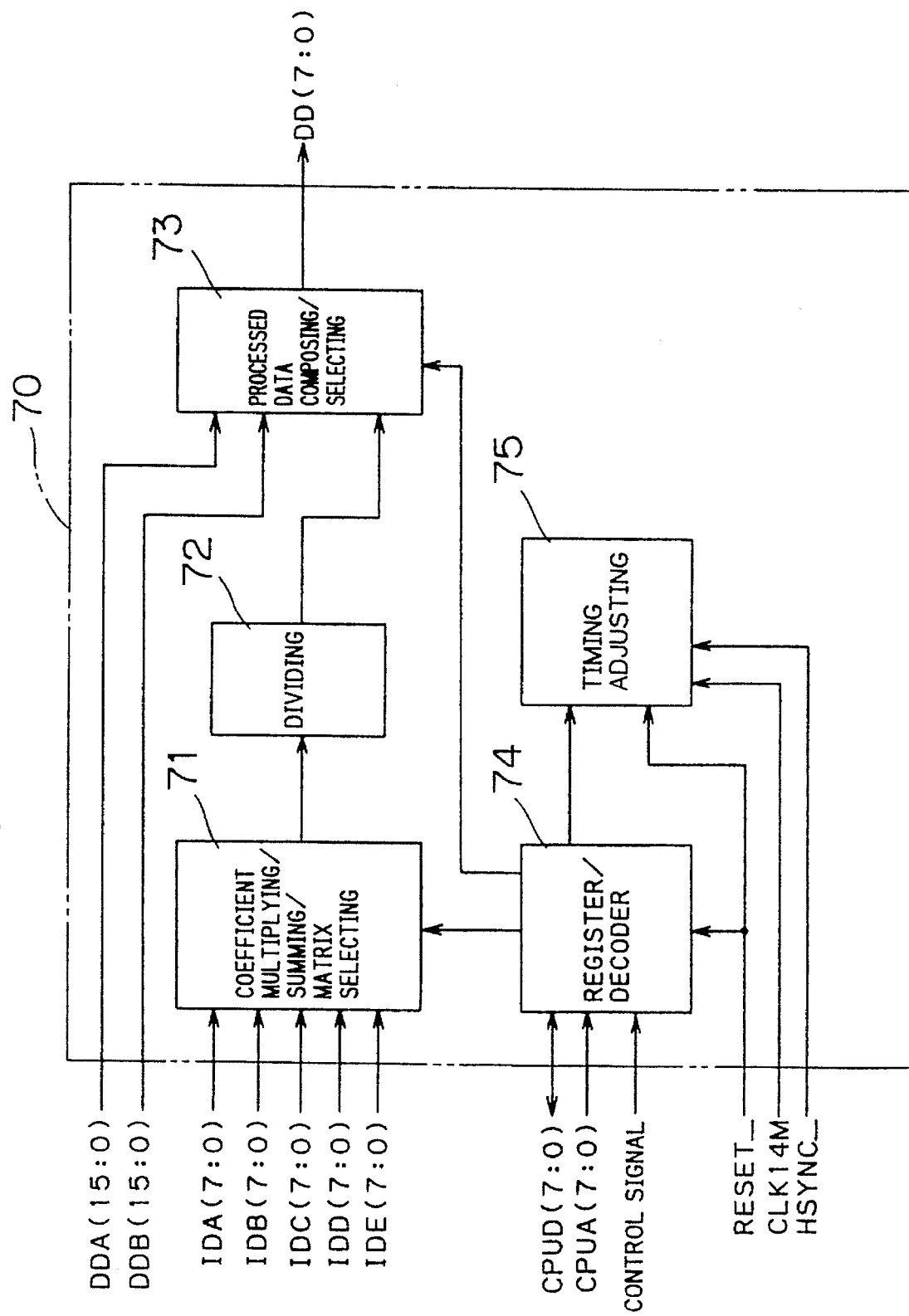
FIG. 6 is a block diagram showing an exemplary system architecture of an integrating filter.

FIG. 6 is a block diagram showing an exemplary structure of the integrating filter. The integrating filter 70 includes a coefficient multiplying/summing/matrix selecting circuit 71 receiving the image data output from the selector circuit 5 (see FIG. 1). A signal processed by the circuit 71 further undergoes a dividing operation in a dividing circuit 72 and then is applied to a processed data composing/selecting circuit 73. The coefficient multiplying/summing/matrix selecting circuit 71 receives in parallel data IDA, IDB, IDC, IDD and IDE (each data is of 8 bit) which are from five lines adjacent to one another in the secondary scanning direction.

The processed data composing/selecting circuit 73 also receives data DDA and DDB output from the differentiating filter 60. The processed data composing/selecting circuit 73 composes the smoothed data from the dividing circuit 72 with the emphasized data from the differentiating filter 60, or selects any data to produce the output data DD (8 bit).

The integrating filter 70 further includes a register/decoder 74 receiving the data CPUD (8 bit) and the address CPUA (8 bit) from the CPU 10 and a timing adjusting circuit 75. A filter coefficient received from the CPU 10 for the integrating filter 70 is transferred from the register/decoder 74 to the coefficient multiplying/summing/matrix selecting circuit 71 and set therein.

The processed data composing/selecting circuit 73 receives a switching signal from the register/decoder 74 and performs either a signal composing operation or a signal selecting operation based upon data from the CPU 10.

Signals illustrated in FIG. 6 include a reset signal RESET, a 14 MHz clock signal CLK14M, and a horizontal synchronizing signal HSYNC.

Figure 7:
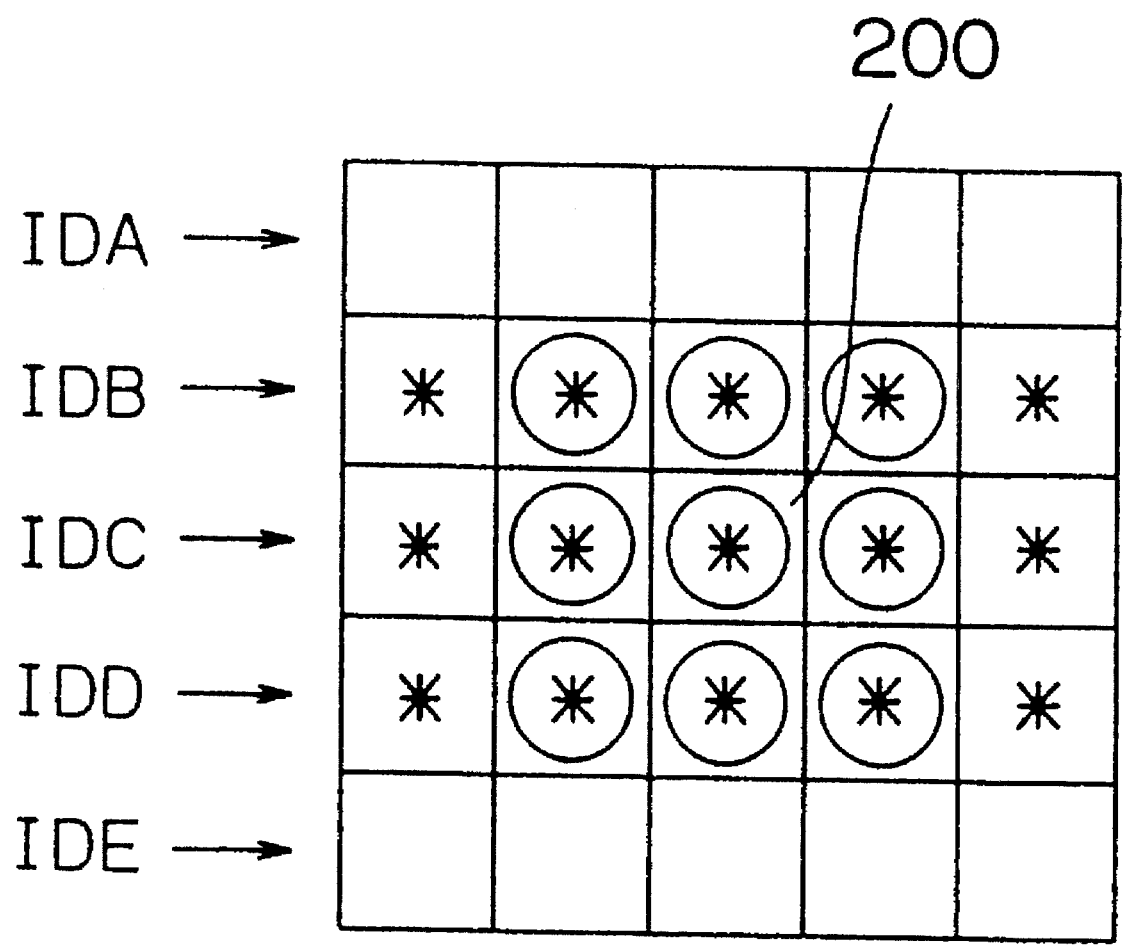
FIG. 7 is a diagram illustrating data processing in the integrating filter.

FIG. 7 is a diagram showing a pixel matrix to be processed in the integrating filter 70. In the integrating filter 70, the data processing is performed on a target pixel 200 according to one of the following first to fourth modes.

I) First mode: to perform the data processing based on an image data within a 3×3 pixel matrix marked with the symbol "○" in FIG. 7.

II) Second mode: to perform the data processing based on an image data within a 3×5 pixel matrix marked with the symbol "*" in FIG. 7.

III) Third mode: to perform the data processing based on all of an image data within a 5×5 pixel matrix.

IV) Fourth mode: to perform the data processing based on an image data within a 1×1 pixel matrix including the target pixel 200 only.

The image data of each pixel to be processed is multiplied by a predetermined coefficient ("1" in the present embodiment), the results of which are summed up. The image data undergoing the filtering processing is obtained by dividing the summed value by a predetermined value (equivalent to the number of pixels in this embodiment).

Figure 8:
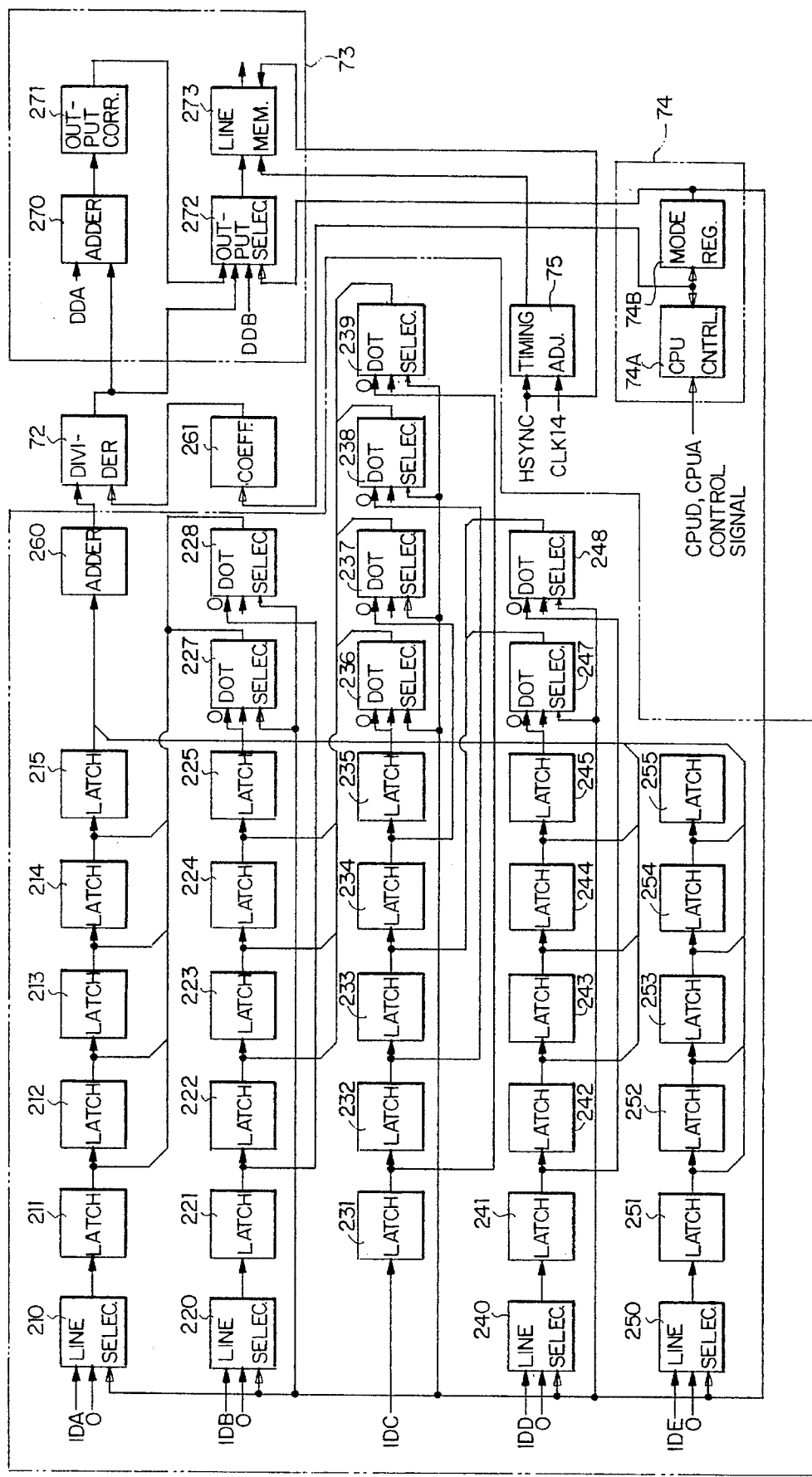
FIG. 8 is a block diagram showing a detailed architecture of a circuit in the integrating filter.

FIG. 8 is a block diagram showing the detailed construction of the integrating filter 70. Data IDA, IDB, IDC, IDD and IDE for five lines are input to obtain data of a 5×5 pixel matrix. In the first and second mode, data IDB, IDC and IDD of the second, third and fourth lines are used, while data IDA, IDB, IDC, IDD and IDE of the first to fifth lines are used in the third mode. In the fourth mode, data IDC of the third line is used.

Data IDA of the first line is input to a line selector 210 to which a constant data "0" is also input. The line selector 210 selects either data IDA or data "0" in accordance with the mode which is retained in the mode register 74A. That is, data "0" is selected when the first, second or fourth mode, while data IDA is selected when the third mode is selected. The output data from the line selector 210 is input in order to five latch circuits 211, 212, 213, 214 and 215 connected in series. When the line selector 210 selects the data IDA of the first line, data of the sequential five pixels in the first line is retained in the latch circuits 211 to 215. All of the retained data in the latch circuits 211 to 215 are input to an adder 260.

The data IDB of the second line is input to the line selector 220 which selects either data IDB or data "0" based on the selecting signal from the mode register 74B. The line selector 220 selects the data IDB in the first, second or third mode, while it selects the data "0" in the fourth mode.

Out of latch circuits 221 to 225 corresponding to the sequential five pixels, the latch circuits 222, 223 and 224 corresponding to the second to fourth pixels output data to the adder 260 while the latch circuits 221 and 225 corresponding to the first and fifth pixels output data to dot selectors 227 and 228 respectively. Each of the dot selectors 227 and 228 selects either one of the data from the latch circuit 221 and 225 or the data "0" based on the selecting signal from the mode register 74B. Specifically, the data "0" is selected in the first mode, and the data from the latch circuits 221 and 225 are selected in the second and third mode. Either data may be selected in the fourth mode. The selected data is input to the adder 260.

The data IDC of the third line is input in order, to five latch circuits 231, 232, 233, 234 and 235 connected in series. The output data from the latch circuit 233 which retains the data of the third pixel which is the target pixel is input to the adder 260. The output data from the latch circuits 231, 232, 234 and 235 are input to dot selectors 236, 237, 238 and 239 respectively. Each of the dot selectors 236, 237, 238 and 239 selects either one of the data from the latch circuit 231, 232 234 and 235 or the data "0" based on the selecting signal from the mode register 74B. Specifically, the dot selectors 236 and 239 select the data "0" and the dot selectors 237 and 238 select the data from the latch circuits 232 and 234 in the first mode. Each of the dot selectors 236, 237, 238 and 239 selects the output data from the latch circuits 231, 232, 234 and 235 in the second and third mode and selects the data "0" in the fourth mode. The selected data are input to the adder 260.

The construction for the data IDD of the fourth line is same as the one for the data IDB of the second line. That is, the line selector 240 selects either one of the data IDB or the data "0" based on the selecting signal from the mode register 74B; the data IDB is selected in the first, second or third mode, and the data "0" is selected in the fourth mode.

The output data from the line selector 240 is input in order, to five latch circuits 241, 242, 243, 244 and 245 connected in series. The output data from the latch circuits 242, 243 and 244 corresponding to the second third and fourth pixels are input to the adder 260. The output data from the latch circuits 241 and 245 corresponding to the first and fifth pixels are respectively input to the dot selectors 247 and 248. The dot selectors 247 and 248 are operated based on the selecting signal from the mode selector 74B so as to select the data "0" in the first mode, and select the data IDD in the second and third mode. Either data may be selected in the fourth mode. The output data from the dot selectors 247 and 248 are input to the adder 260.

The construction for the data IDE of the fifth line is same as the one for the data IDA of the first line. That is, the line selector 250 selects either one of the data IDE or the data "0" based on the selecting signal from the mode register 74B; the data "0" is selected in the first, second or fourth mode, and the data IDE is selected in the third mode.

The output data from the line selector 250 is input in order, to five latch circuits 251, 252, 253, 254 and 255 connected in series. All of the output data of the latch circuits 251, 252, 253, 254 and 255 are input to the adder 260.

As described above, in a coefficient multiplying/summing/matrix selecting circuit 71, data of one, nine, fifteen or twenty-five pixels are added in accordance with the set mode. The result output from the adder 260 is input to a dividing circuit 72 where the dividing calculation is performed with the output from the adder 260 as a dividend and the coefficient set in a coefficient register 261 from the CPU control unit 74A in a register/decoder circuit 74 as a divisor. The number of pixels used for the filter processing is set in the coefficient register 261 as follows: "9" in the first mode, "15" in the second mode, "25" in the third mode and "1" in the fourth mode.

The output from the dividing circuit 72 is input to a processed data composing/selecting circuit 73 to which the second differential data DDA from the differentiating filter 60 and the emphasized data DDB are also input. The second differential data DDA is summed up with the output data from the dividing circuit 72 in an adder 270 and input to an output selector 272 via a output correcting circuit 271. The output selector also receives the output data from the dividing circuit 72 and the emphasized data DDB and selects one of them based on the selecting signal from the mode register 74B to input to a line memory 273. In the line memory 273, writing and reading of data are controlled in accordance with the signal from the timing adjusting circuit 75.

FIG. 9 is a flow chart illustrating a data setting procedure for the differentiating filter 60 and the integrating filter 70 by the CPU 10.

The procedure will now be described according to the flow chart of FIG. 9 with reference to FIGS. 1 to 8.

In the event that the ACPS key 131 out of the mode selection keys 13 in the operating unit 12 is selected to choose the adaptive character-area processing mode (YES at Step S11), it is judged whether the developed color is Bk or not (Step S13); that is, it is judged whether the image data output from the color selector 5 is an image data of Bk and the image is to be developed by Bk toner.

If the developed color is Bk, the CPU 10 sets a filter coefficient for the character mode in the coefficient multiplying/summing/matrix selecting circuit 61 in the differentiating filter 60. This allows the differentiating filter 60 to conduct the filtering operation suitable to the character mode to emphasize outlines of characters.

The filter coefficients for a character mode set in the coefficient multiplying/summing/matrix selecting circuit 61 are, for example, the ones as follows. In the following formula (7), the value "1.2" described left side of the matrix is a gain coefficient.

$$1.2 \times \begin{array}{|c|c|c|} \hline -1 & 0 & -1 \\ \hline 0 & 4 & 0 \\ \hline -1 & 0 & -1 \\ \hline \end{array} \tag{7}$$

The differentiating filter 60 performs filtering operation according to the first mode where data processing is performed based on the image data within a 3×3 pixel matrix. Each of the coefficients is set to the coefficient registers 141 to 149 as follows:

| | |
|---|---|
| Coefficient register 141 | −1 |
| Coefficient register 142 | 0 |
| Coefficient register 143 | −1 |
| Coefficient register 144 | 0 |
| Coefficient register 145 | 4 |
| Coefficient register 146 | 0 |
| Coefficient register 147 | −1 |
| Coefficient register 148 | 0 |
| Coefficient register 149 | −1 |

The value "1.2" is set as a gain coefficient in the coefficient register 126 for adjusting a gain shown in FIG. 5. A filter coefficient for a multiplying operation suitable to the character mode is set in the coefficient multiplying/summing/matrix selecting circuit 71 in the integrating filter 70. This allows the integrating filter 70 to conduct a filtering operation to somewhat prevent outlines of a character and the like from blurring. The processed data composing/selecting circuit 73 in the integrating filter 70 turns its operation into composing the processed data, so that it composes an output from the differentiating filter 60 with an output received from the dividing circuit 72 to output the resultant signal (Step S14). That is, the data from the output correcting circuit 271 is selected in the output selector 272 in FIG. 8.

The following is a filter coefficient suitable to a character mode set in the coefficient multiplying/summing/matrix selecting circuit 71.

$$\frac{1}{1} \times \begin{array}{|c|} \hline 1 \\ \hline \end{array} \tag{8}$$

In other words, the above mentioned fourth mode is selected in the integrating filter 70. Then, The value "1" is set in a coefficient register 261 for holding a divisor for a dividing calculation shown in FIG. 8.

On the other hand, if it is judged that the developed color is not Bk (NO at Step S13), the CPU 10 sets photograph mode filter data in the integrating filter 70 (Step S15). When the photograph mode filter data is set, the integrating filter 70 changes the filter coefficient for the multiplying operation in the coefficient multiplying/summing/matrix selecting circuit 71 into a coefficient suitable to the photograph mode. This allows the integrating filter 71 to perform an operation for smoothing multi-gradation data.

The following coefficient is an example of a coefficient suitable for a photograph mode.

$$\frac{1}{9} \times \begin{bmatrix} 1 & 1 & 1 \\ 1 & 1 & 1 \\ 1 & 1 & 1 \end{bmatrix} \quad (9)$$

In the photograph mode, the operation of the integrating filter 71 is selected to the first mode, for instance. Then, the value "9" is set in the coefficient register 261 in FIG. 8.

The processed data composing/selecting circuit 73 in the integrating filter 70 is set to select an output from the dividing circuit 72; that is, when the photograph mode filter data is set, the processed data composing/selecting circuit 73 does not select data received from the differentiating filter 60 but selects only the data processed by the integrating filter 70. This allows the integrating filter 70 alone to perform a filtering operation in the filtering circuit 6 (see FIG. 1).

In the event that another mode selection key is selected to choose a mode other than the adaptive character-area processing mode in the flow chart of FIG. 9, data in selected one of the image reproducing modes is set in the differentiating filter 60 and the integrating filter 70 (Step S12). In the character mode, for example, a filter coefficient for the character mode is set in each of the differentiating filter 60 and the integrating filter 70, and the processed data composing/selecting circuit 73 in the integrating filter changes its operation to a data composing process. In the character-photograph mode, a filter coefficient different from that used in the character mode is set in the differentiating filter 60 and the integrating filter 70. In such a case, examples of filter coefficients set in the differentiating filter 60 and the integrating filter 70 are as follows.

Differentiating filter 60:

$$0.8 \times \begin{bmatrix} -1 & 0 & -1 \\ 0 & 4 & 0 \\ -1 & 0 & -1 \end{bmatrix} \quad (10)$$

Integrating filter 70:

$$\frac{1}{9} \times \begin{bmatrix} 1 & 1 & 1 \\ 1 & 1 & 1 \\ 1 & 1 & 1 \end{bmatrix} \quad (11)$$

Moreover, in the photograph mode, the integrating filter 70 obtains a coefficient for the photograph mode as a filter coefficient, and the processed data composing/selecting circuit 70 is set to select only the output from the dividing circuit 72 so that only the output from the integrating filter 70 is used.

In this way, the image data which has undergone the filtering process in the filtering circuit 6 is reduced or magnified as required in the zoom circuit 7 and then transferred to the halftone processing circuit 8.

A structure of the halftone processing circuit 8 and its operation in the adaptive character-area processing mode will now be described.

FIGS. 10, 11 and 12 are diagrams illustrating input value—output density characteristics in different modes in the halftone processing circuit 8. FIGS. 10, 11 and 12 correspond to the photograph mode, the character mode and the character-photograph respectively.

In the present embodiment, an individual input value—output density characteristic is adopted for each image data of colors as shown in FIGS. 10, 11 and 12 where FIGS. 10A, 11A and 12A show the input value—output density characteristic corresponding to the M data, FIGS. 10B, 11B and 12B show the one corresponding to the C data, FIGS. 10C, 11C and 12C show the one corresponding to the Y data, and FIGS. 10D, 11D and 12D show the one corresponding to the Bk data.

In the character mode, for example, such the characteristic that the output density varies greatly when the input value is small is adopted as shown in FIG. 11. Such a characteristic between the input value and output density is suitable to the character mode which requires high resolution because outlines of characters are emphasized against the background to make a sharp contrast.

In the photograph mode, however, the input value—output density characteristic is set so that the input value is almost in proportion to the output density, as shown in FIG. 10. Such a characteristic is suitable to representation of gradation because variations in density are smoothed to moderate contrast.

In the character-photograph mode, the medium characteristic of the FIGS. 10 and 11 is adopted as shown in FIG. 12.

Thus, in the event of employing the photograph mode for the image reproducing mode in the color image processing apparatus shown in FIG. 1, the input value—output density characteristic in the halftone processing circuit 8 is set to the photograph mode characteristic as shown in FIG. 10, while in the event of employing the character mode, it is set to the character mode characteristic as shown in FIG. 11. Or otherwise, in the character-photograph mode, it is set to the character-photograph mode as shown in FIG. 12.

Moreover, in the ACPS mode, the input value—output density characteristic is changed between the character mode characteristic and the photograph mode characteristic in accordance with colors of the image data, as will be described below.

The halftone processing circuit 8 employs a multi-value dither technique where density of one pixel is expressed with a plural gradation. The multi-value dither technique is explained with FIGS. 13A and 13B. One pixel is composed of four dots D1, D2, D3 and D4 arranged in a matrix manner. The density of each dot D1 to D4 is varied with 64 gradation by changing a colored area, so that the density of one pixel is expressed with 256 (=64×4) gradation.

Figure 13A:
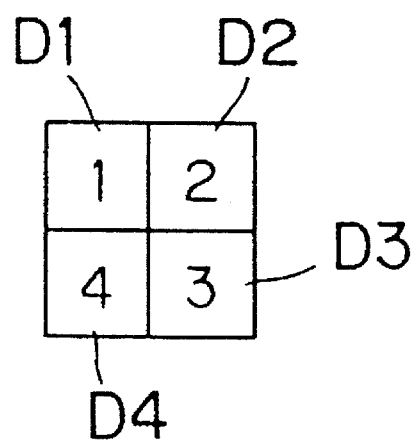
FIGS. 13A and 13B are diagrams illustrating a multi-level dither technique.
Figure 13B:
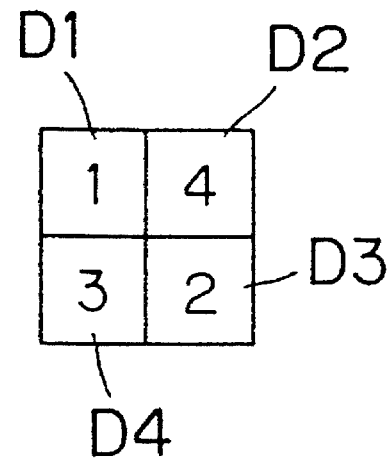

FIGS. 13A and 13B show the order of coloring when the colored area in the one pixel is increased, in other words, show the process of thickening the pixel.

The technique shown in FIG. 13A is so-called swirl type in which the colored area is increased in order swirly with the increase of the density to be expressed. In this case, the colored area of the dot D1 is increased with the increase of the density to be expressed. After the whole area of the dot D1 is colored, the coloring to the dot D2 is performed. Thus, with the increase of the density, the coloring to the D3 and D4 is performed in order.

The technique shown in FIG. 13B is called as a cross type, which increase the colored area in X-like with the increase of the density to be expressed. The coloring is performed in the order of the dot D1, D3, D4 and D2 with the increase of the density to be expressed so as to colored area of each dot D1 to D4 uniformly. For example, if the gradation of the density to be expressed in the pixel is "42", some part of the area of each dot is colored as follows: 11 out of 64 of the dot D1, 11 out of 64 of the dot D2, 10 out of 64 of the dot D3 and 10 out of 64 of the dot D4 are colored.

The swirl type technique shown in FIG. 13A is employed in the photograph mode while the cross type technique shown in FIG. 13B is employed in the character mode and the character-photograph mode since the former technique is suitable for reproducing the smooth image while the latter technique is relatively suitable for reproducing the sharp image.

Figure 14:
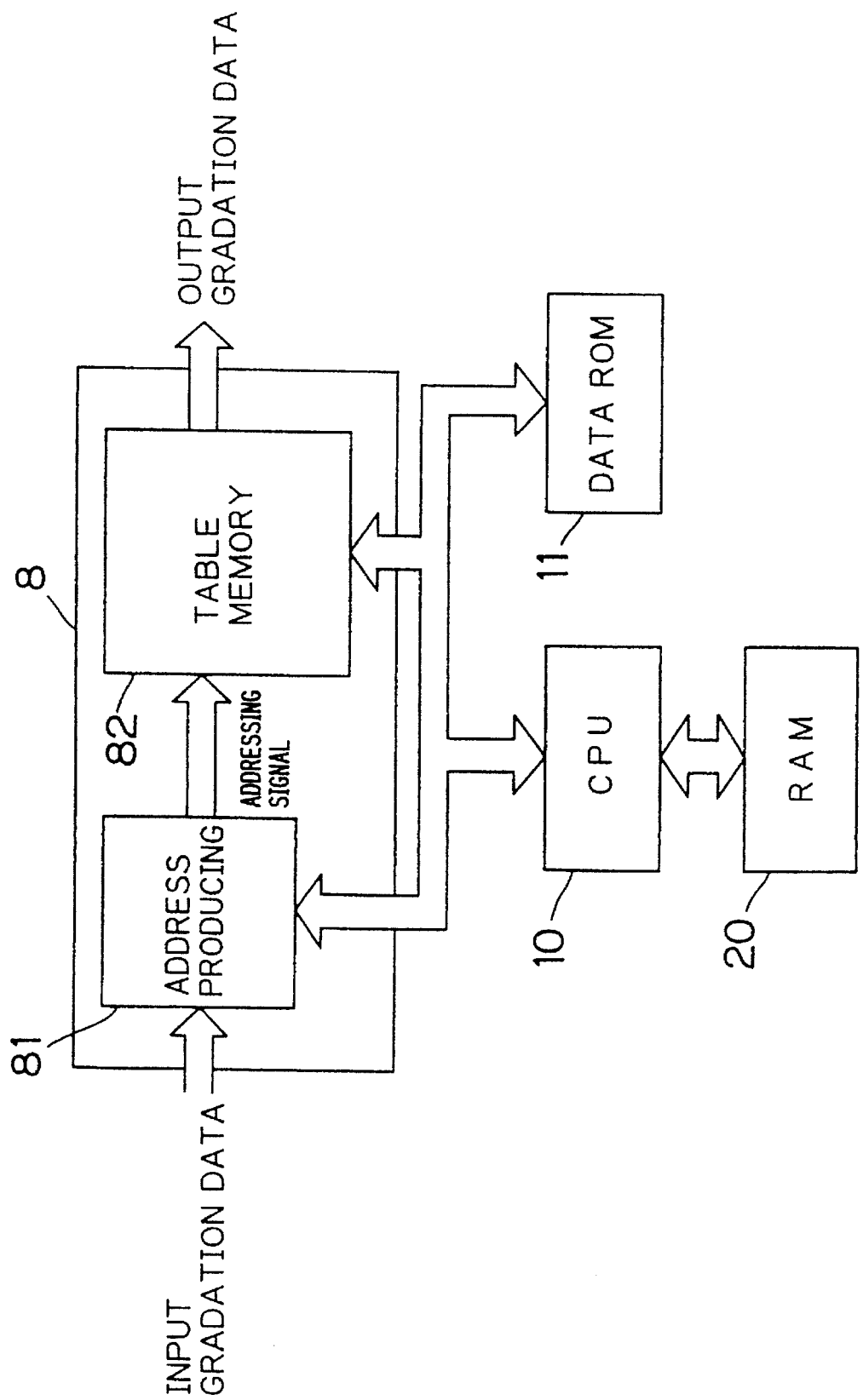
FIG. 14 is a block diagram showing an exemplary system architecture of a halftone processing circuit.

FIG. 14 is a block diagram showing a system architecture of the halftone processing circuit 8 shown in FIG. 1. The halftone processing circuit 8 includes an address producing circuit 81 and a table memory 82. Image data output from the zoom circuit 7 (see FIG. 1) is applied as input gradation data to the address producing circuit 81. The address producing circuit 81 produces addresses based upon the input gradation data and assigns addresses for the table memory 82 based upon the produced addresses. The table memory 82 stores output gradation data (halftone processing data) read from the data ROM 11 by the CPU 10. The output gradation data stored in an address is output in accordance with the assignment of the address. As a result, the pattern of the colored pixels including the arrangement pattern of the colored pixel, the colored area of each pixel and the like is designated.

The table memory 82 is reloaded with the output gradation data in accordance with the image reproducing mode.

Figure 15:
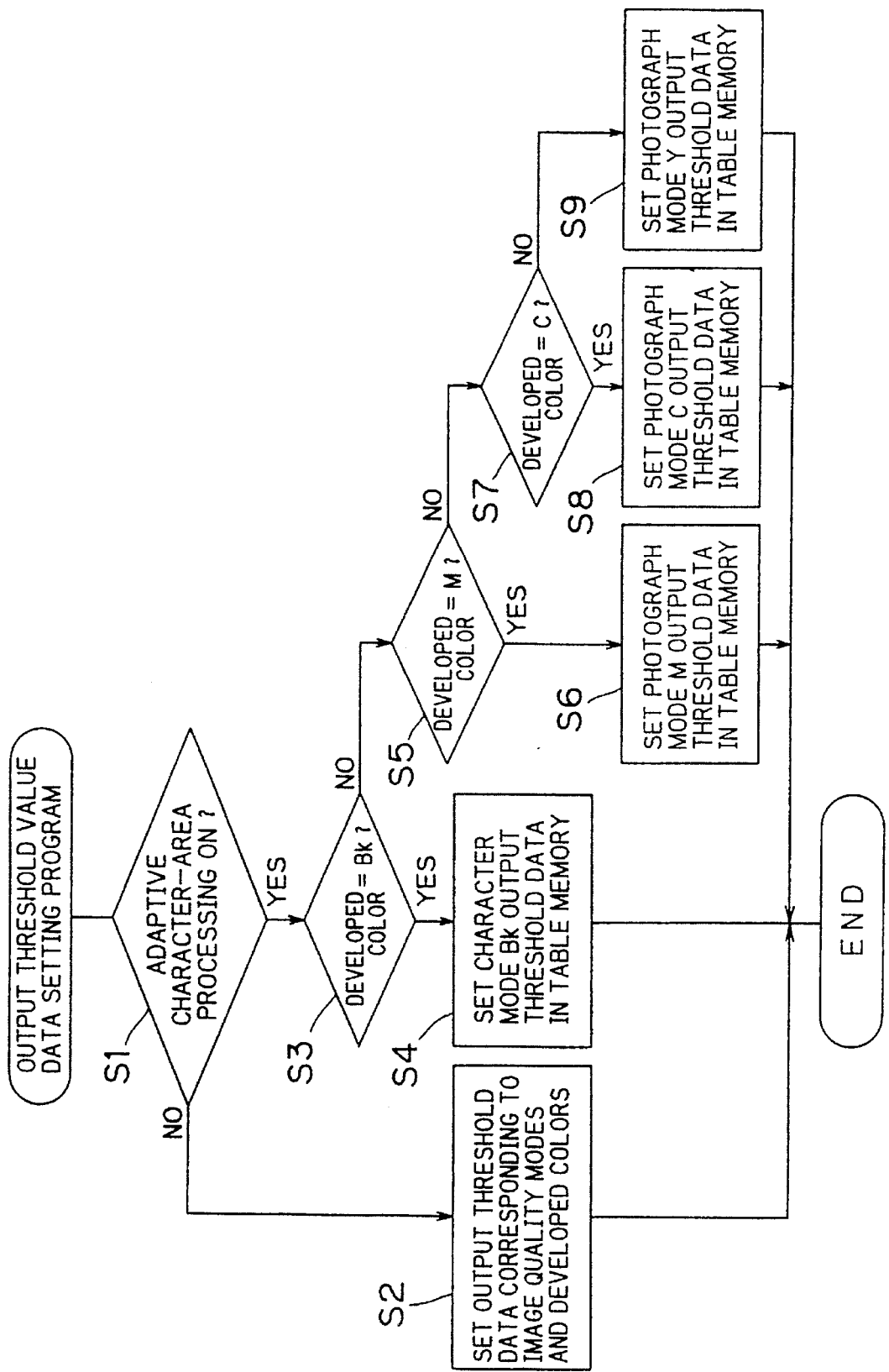
FIG. 15 is a flow chart illustrating a procedure of reloading a table memory with data by the CPU.

Reloading the table memory 82 with data by the CPU 10 will be described with reference to the block diagram in FIG. 14 and the flow chart in FIG. 15.

The CPU 10 judges whether or not the current mode is the adaptive character-area processing mode where the ACPS key 131 is selected (Step S1). In the event of other operation modes where any key other than the ACPS key 131 is selected, the CPU 10 reads output threshold value data corresponding to the image reproducing modes and developed colors and set them in the table memory 82 (Step S2).

In the event of the adaptive character-area processing mode where the ACPS key 131 is selected, colors of toner which is to be developed is identified (Steps S3, S5 and S7).

In the event of development with black toner (YES at Step S3), threshold data of the input value—output density characteristic in the character mode shown in FIG. 11D is set in the table memory 82 (Step S4).

When toners other than the Bk toner, such as magenta, cyan and yellow toner, are used for the development, threshold data of the input value—output density characteristic for the photograph mode as shown in FIG. 10A, 10B and 10C are set in the table memory 82. In such a case, the appropriate threshold data on each color is set in the table memory depending upon desired one of the developed colors M, C or Y. In this way, a developing process for the optimum halftone representation of each color can be conducted (Steps S6, S8 and S9).

Although the preferred embodiment of the present invention has been described above, it is not intended that the present invention be restricted to them. In the above-mentioned preferred embodiment, for example, in the case where after the adaptive character-area processing is performed by the character adapting circuit 3 shown in FIG. 1, image data processed in the previous step is to be developed with toner of four colors including Y, M, C and Bk in the adaptive character-area processing mode where the ACPS key 131 is selected, the filtering process and halftone reproducing process are varied depending upon the colors of the toner used for the development so that the development with the toner of those colors can result in the optimum reproduction by virtue of the adaptive character-area processing.

However, it is not necessary in the present invention that both the filtering process and halftone reproducing process are always varied depending upon the colors of the toner used for the development in the adaptive character-area processing mode. For example, the filtering process alone may be varied depending upon the colors of the toner used for the development, or otherwise, the halftone reproducing process alone may be varied depending upon the colors of the toner while the filtering process is kept unchanged for any color of the toner.

Although the detailed description of preferred embodiments of the present invention has been described to set forth the technical subjects of the present invention, they should be taken by way of example only but not be taken by way of limitation. The true spirit and scope of the present invention should be defined by the appended claims.

What is claimed is:

1. A color image processing apparatus, comprising adaptive character-area processing means for processing input image data corresponding to a full color multigradation image including a noncolored character image so as to obtain a high resolution noncolored character image, the image data including color image data, the color image data including yellow color data, magenta color data, cyan color data and black color data for each pixel constituting the image, said adaptive character-area processing means adjusting the color image data of a black edge pixel to increase a density of black and to reduce densities of yellow, magenta and cyan;

color image data selecting means for dividing the image data output from the adaptive character-area processing means into the color image data of each of yellow, magenta, cyan and black for toner development;

image data processing means for selectively processing the color image data output from the color image data selecting means according to either a first image processing suitable for reproducing a binary image or a second image processing suitable for reproducing a multi-value image; and control means for controlling said image data processing means to practice said first image processing when the color image data selecting means outputs the black color image data, and for controlling said image data processing means to practice said second image processing when the color image data selecting means outputs the color image data of a color other than black.

2. A color image processing apparatus according to claim 1, wherein said image data processing means is a filtering means for filtering the color image data output from the color image data selecting means;

said first image processing is a filtering for emphasizing a varied point in the image data; and said second image processing is a filtering for smoothing a varied point in the image data.

3. A color image processing apparatus according to claim 2, wherein a filter characteristic can be externally set in said filtering means;

when the color image data selecting means outputs the black color image data, said control means sets in said filtering means the filter characteristic by which a varied point of the image data is emphasized; and when the color image data selecting means outputs the color image data of a color other than black, said control means sets in said filtering means the filter characteristic by which a varied point of the image data is smoothed.

4. A color image processing apparatus according to claim 1, wherein said image data processing means is a halftone processing means which refers a signal intensity of the color image data output from the color image data selecting means to a signal intensity—density characteristic to specify a pattern of colored pixels so that a predetermined density can be obtained in accordance with the signal intensity;

said first image processing is a processing for using the signal intensity—density characteristic suitable for reproducing the binary image to specify the pattern of the colored pixels; and said second image processing is a processing for using the signal intensity—density characteristic suitable for reproducing a halftone of a multi-value image to specify the pattern of the colored pixels.

5. A color image processing apparatus according to claim 1, wherein said image data processing means includes filtering means for performing a required filtering of the color image data output from the color image data selecting means, and halftone processing means referring a signal intensity of the color image data output from the color image data selecting means to a signal intensity—density characteristic to specify a pattern of colored pixels so that a predetermined density can be obtained in accordance with the signal intensity;

corresponding to said first image processing, said filtering means performs a filtering for emphasizing a varied point of image data and said halftone processing means performs a processing for using a signal intensity—density characteristic suitable for reproducing a binary image to specify a pattern of colored pixels; and corresponding to said second image processing, said filtering means performs a filtering for smoothing a varied point of the image data and said halftone processing means performs a processing for using the signal intensity—density characteristic suitable for reproducing a halftone of a multi-value image to specify the pattern of the colored pixels.

6. A color image processing apparatus according to claim 5, wherein a filter characteristic can be externally set in said filtering means;

when the color image data selecting means outputs the black color image data, said control means sets in said filtering means the filter characteristic by which a varied point of the image data is emphasized; and when the color image data selecting means outputs the color image data of a color other than black, said control means sets in said filtering means the filter characteristic by which a varied point of the image data is smoothed.

7. A color image processing method for processing image data that include color image data for each pixel of an image, the color image data including yellow color data, magenta color data, cyan color data, and black color data, said method comprising the steps of performing a specified adaptive character-area processing to input image data corresponding to a full color multi-gradation image including a noncolored character image so as to obtain a high resolution noncolored character image;

adjusting the color image data of a black edge pixel to increase the density of black and to reduce the densities of yellow, magenta and cyan;

dividing the image data which has undergone the adaptive character-area processing into color image data of each of yellow, magenta, cyan and black for toner development;

performing a first image processing suitable for reproducing a binary image for the black color image data, and performing a second image processing suitable for reproducing a multi-value image for color image data other than black color image data.

8. A color image processing method according to claim 7, wherein said first image processing is a filtering for emphasizing a varied point in the image data; and said second image processing is a filtering for smoothing a varied point in the image data.

9. A color image processing method according to claim 7, wherein said first image processing is a halftone processing for referring a signal intensity of the color image data to a signal intensity—density characteristic suitable for reproducing a binary image to specify a pattern of colored pixels so that a predetermined density can be obtained in accordance with the signal intensity; and said second image processing is a halftone processing for referring the signal intensity of color image data to the signal intensity—density characteristic suitable for a halftone reproducing of a multi-value image to specify the pattern of the colored pixels so that a predetermined density can be obtained in accordance with the signal intensity.

10. A color image processing method according to claim 7, wherein said first image processing includes a first filtering for emphasizing a varied point of the image data, and a first halftone processing for referring a signal intensity of the color image data to a signal intensity—density characteristic suitable for reproducing a binary image to specify a pattern of colored pixels in accordance with the signal intensity so that a predetermined density can be obtained; and said second image processing includes a second filtering for smoothing a varied point of the image data, and a second halftone processing for referring a signal intensity of the color image data to the signal intensity—density characteristic suitable for a halftone reproducing of a multi-value image to specify the pattern of the colored pixels in accordance with the signal intensity so that a predetermined density can be obtained.

* * * * *